United States Patent [19]

Zenty

[11] 4,097,349
[45] Jun. 27, 1978

[54] PHOTOCHEMICAL PROCESS FOR FOSSIL FUEL COMBUSTION PRODUCTS RECOVERY AND UTILIZATION

[76] Inventor: Stephen Zenty, 193 Talbott St., Rockville, Md. 20852

[21] Appl. No.: 672,124

[22] Filed: Mar. 31, 1976

[51] Int. Cl.² .............................................. B01J 1/10
[52] U.S. Cl. .................................. 204/158 R; 60/274; 204/157.1 R; 204/162 R
[58] Field of Search .................... 60/274; 204/157.1 R, 204/158 R, 162 R

[56] References Cited

U.S. PATENT DOCUMENTS

| | | | |
|---|---|---|---|
| 2,968,719 | 1/1961 | Haberle et al. | 250/43 |
| 3,236,045 | 2/1966 | Berger et al. | 60/30 |
| 3,462,354 | 8/1969 | Levy | 204/158 R |
| 3,507,760 | 4/1970 | Levy | 204/157.1 R |
| 3,565,777 | 2/1971 | Lauer | 204/157.1 R |
| 3,653,185 | 4/1972 | Scott et al. | 55/103 |
| 3,676,318 | 7/1972 | Lauer | 204/193 |
| 3,862,043 | 1/1975 | Haakenson | 204/157.1 R |
| 3,869,362 | 3/1975 | Machi et al. | 204/157.1 R |
| 3,903,694 | 9/1975 | Aine | 60/274 |
| 3,984,296 | 10/1976 | Richards | 204/157.1 R |

Primary Examiner—Leland A. Sebastian
Attorney, Agent, or Firm—Beall & Jeffery

[57] ABSTRACT

Sulfur dioxide ($SO_2$) and oxides of nitrogen ($NO_x$) are effectively and economically removed from a gaseous combustion products stream by photochemical conversion of the gaseous $SO_2$ and $NO_x$ components into particulates (aerosols and mists). The reactive hydrocarbon (RHC) and oxygen deficient fossil fuel combustion products can be converted into a highly photochemically reactive $RHC,SO_2,NO_x(NO,NO_2),O_2,H_2O$ gaseous mixture by the introduction of sufficient quantities of a reactive hydrocarbon, such as an olefin, and oxygen or oxygen containing air. The reactant mixture is then irradiated with electromagnetic waves of the 1,500Å to 7,500Å band of the spectrum, which irradiation is followed by ammonia injection, if desired, to promote particulate formation. The particulate nitrogenous, sulfrous ("nitrates" and "sulfates") and other particulate compounds are removed from the stream by a conventional particulate control system and the products and byproducts can be separated and converted into valuable products of economic value, such as organic and inorganic acids, fertilizers and the like.

9 Claims, 1 Drawing Figure

PHOTOCHEMICAL PROCESS FOR FOSSIL FUEL COMBUSTION PRODUCTS RECOVERY AND UTILIZATION

BACKGROUND AND SUMMARY OF THE INVENTION

The usefullness of the disclosed process and apparatus lies in its function of reducing $SO_2$ and $NO_x$ emissions from fossil fuel combustion products to below or near levels judged environmentally safe and necessary for public health protection. By the application of the disclosed process, large quantities of high sulfur content Eastern U.S. coal reserves, now unavailable at reasonable costs for electric power generation because of sulfur emission air pollution regulations, could be made available. Since the U.S. coal reserves are judged adequate, at the present energy consumption rate, for 300 to 500 years, the utilization of the high sulfur U.S. coal reserves in an environmentally safe manner could substantially contribute to U.S. energy independence by freeing substantial quantities of oil and natural gas for higher end uses, such as home heating, industrial applications and transportation. In addition, the disclosed process offers a novel approach for the substantial reduction of $NO_x$ emissions which hitherto have been judged one of the most significant yet one of the most difficult air pollutants to control.

The application of photochemical process for fossil fuel $SO_2$ and $NO_x$ combustion products air pollution control represents a significantly useful and novel means for increased public health protection and increased national energy independence.

The products and byproducts of atmospheric photochemical reactions of fossil fuel combustion products, $SO_2$ and $NO_x$, and reactive hydrocarbons (RHCs), namely sulfates and nitrogen dioxide, have been associated with large scale chronic disease mortalities in U.S. urban areas. These chronic diseases are the neoplasms of the respiratory system and gastro-intestinal tract; cardiovascular diseases such as arteriosclerotic heart disease and hypertensive heart disease; and nephritis. Some investigators have estimated that as much as 15 to 20% of all mortalities in U.S. metropolitan areas, or 200,000 to 300,000 deaths annually, may be associated with fossil fuel combustion products air pollution. Reduction of fossil fuel air pollution is therefore of paramount importance.

The principal primary reactants of atmospheric photochemical reactions are reactive hydrocarbons, $NO_x$, principally NO, and $SO_2$. It is well known that when a mixture of these primary reactants is irradiated with sunlight or electromagnetic waves in the ultraviolet (UV) range, a host of photochemical reactions take place which result in the creation of secondary gaseous reactants such as $NO_2$, ozone, peroxides, aldehydes, $SO_3$ and several others which may themselves undergo additional photochemical and other chemical reactions to result in photochemically related particulate and gaseous products. The most important, and perhaps the best known ones, are sulfates and nitrates, including nitric-nitrous and sulfuric acids; polycyclic organic matter, including benzo(a) pyrene, a suspected carcinogen; and particulate nitrogenous compounds perhaps the best known of which are peroxyacetyl nitrate (PAN), nitrosamines and related compounds.

The characteristic and most important feature of the products of photooxidation, from an emission control point of view, is that most of them are particulate in form and thus can be readily removed by conventional particulate control methods. The photochemical process converts, and thus consumes the primary reactants, $SO_2$, $NO_x$ and RHCs.

The definition of hydrocarbon reactivity in photochemistry is important. For purposes of this disclosure, the concept of reactivity includes the rate of primary reactants disappearance (HC, $SO_2$ and NO) or the rate of creation or appearance of the products of photochemical reactions such as $NO_2$ or oxidants. Classes of hydrocarbons, and individual hydrocarbons within the same class, have different reactivities. On a relative scale of reactivity, paraffins, straight chain saturated hydrocarbons, have the lowest reactivity. Aromatics and oxygenates have higher reactivities than paraffins. Unsaturated hydrocarbons, such as olefins, among them dienes, have the rank in the highest ranges of the hydrocarbon reactivity spectrum. The general rule is that the higher carbon number members of a class are more reactive than the lower carbon number members. Reactivity of hydrocarbons dramatically increases as the number of double bonds increase.

Several mechanisms have been offered to explain the details of the $RHC$-$SO_2$-$NO_x$-$O_2H_2O$ system photochemical reactions, although some reactions are yet imperfectly understood. There is however, general agreement that the principal photochemical reactions involve chain reactions with a number of free radicals acting as intermediaries. Some of the important radicals have been identified as alkyl (R.), and acyl (RCO), peroxyalkyl (ROO., including $HO_2$.), peroxyacyl

and acylate

For example, for purposes of illustration, an oversimplified and incomplete reaction mechanism can be postulated as follows:

(1) $NO_2$ + (UV) → NO + O
(2) O + $O_2$ + RHC → $RO_2$., etc.
(3) $RO_2$. + $NO_2$ → PAN, etc.
(4) $RO_2$. + $SO_2$ → $RO_2SO_2$ + RO., etc.
(5) O + $O_2$ → $O_3$
(6) NO + $O_3$ → $NO_2$ + $O_2$
(7) $SO_3$ + $H_2O$ → $H_2SO_4$
(8) $O_3$ + $NO_2$ → $NO_3$ + $O_2$
(9) $NO_3$ + $NO_2$ → $N_2O_5$
(10) $N_2O_5$ + $H_2O$ → 2 $HNO_3$ It can readily be noted that if ammonia is present in a moist environment, ammonium salt of sulfuric and nitric acids readily form as shown:

(11) $H_2SO_4$ + 2$NH_4OH$ → $(NH_4)_2SO_4$ + 2$H_2O$
(12) $HNO_3$ + $NH_4OH$ → $NH_4NO_3$ + $H_2O$

It is believed, however, that in presence of moisture hydroxyl radical (HO.) reactions dominate, in which case NO and $SO_2$ conversions may proceed as shown:

(13) $HO\cdot + SO_2 \rightarrow HOSO_2$
(14) $HOSO_2 + O_2 \rightarrow HOSO_2O_2$
(15) $HOSO_2O_2 + NO \rightarrow NO_2 + HOSO_2O$
(16) $HOSO_2O + RH \rightarrow H_2SO_4 + R$, where RH represents an organic compound or radical.

There are, in addition, other postulated sulfur dioxide conversion mechanisms, namely, the chemical reactions of photochemically excited states of sulfur dioxide. It is well known that the major sunlight absorption of $SO_2$ occurs within a relatively strong band which extends from 3400Å to 2400Å. Absorption within this band results initially in the generation of an excited single state in $SO_2$. This absorption may be represented as shown:

(17) $SO_2 + h\nu\ (3400-2900\text{Å}) \rightarrow {}^1SO_2$

A second "forbidden" absorption region of $SO_2$ extends from 4000 to 3400Å. The absorption of sunlight within this region results in the direct excitation of $SO_2$ to an excited triplet species, ${}^3SO_2$, as depicted below:

(18) $SO_2 + h\nu\ (4000-3400\text{Å}) \rightarrow {}^3SO_2$

Through a series of steps, the singlet excited ${}^1SO_2$ can be transformed into the triplet state, ${}^3SO_2$. The excited triplet state can be chemically quenched as shown:

(19) ${}^3SO_2 + M \rightarrow$ products, where M is some molecule other than $SO_2$.

Some compelling evidence suggests that the major, if not the exclusive, chemically reactive entity in the photochemistry of pure $SO_2$ is the ${}^3SO_2$ molecule. Of great interest to the photochemical reactions of the excited triplet state $SO_2$ are the ${}^3SO_2$-quenching rates of atmospheric compounds, such as are shown in Table 1 below:

Table 1. Summary of Quenching Rate Constant Data for Sulfur Dioxide Triplet Molecules with Various Atmospheric Components and Common Atmospheric Contaminants at 25° C. (H. W. Sidebottoms et al)

| Compound | Quenching rate - Kg liter/mole-sec $\times 10^{-8}$ |
| --- | --- |
| Nitrogen | 0.85 ± 0.10 |
| Oxygen | 0.96 ± 0.11 |
| Water | 8.9 ± 1.2 |
| Carbon monoxide | 0.84 ± 0.04 |
| Carbon dioxide | 1.14 ± 0.07 |
| Nitric oxide | 741 ± 33 |
| Ozone | 11.0 ± 1.2 |
| Methane | 11.6 ± 0.16 |
| Propylene | 850 ± 87 |
| CIS-2-butene | 1340 ± 98 |

Comparison of the rate constants in Table 1 indicates that both nitric oxide and reactive hydrocarbons (propylene and CIS-2-butene) have orders of magnitude greater quenching rates than the other compounds.

Fossil fuel burning power plant combustion products contain $SO_2$, NO, $NO_2$, $N_2$, $H_2O$, $CO_2$, CO and very little oxygen and RHCs. The composition of flue gasses from burning one percent sulfur-bearing fuel oil may be:

$SO_2$ = 600 ppm; NO = 200 ppm; $NO_2$ = 15 ppm; $N_2$ = 7.5 $\times$ 10$^5$ ppm; $H_2O$ = 1.3 $\times$ 10$^5$ ppm; $CO_2$ = 1.2 $\times$ 10$^5$ ppm;

$O_2 \cong$ 0.0 ppm; and RHC $\cong$ 0.0 ppm. If excess air is used in combustion, the $O_2$ concentration may be higher.

It can be readily seen that to make the above flue gasses photochemically reactive, analogous to a RHC-$NO_x$-$SO_2$-$O_2$-$H_2O$ system, a RHC and oxygen must be added in sufficient quantities prior to irradiation. An indispensible element of the disclosed invention is the creation of the proper photochemically reactive RHC-$NO_x$-$SO_2$-$O_2$-$H_2O$ gaseous system most favorable to $SO_2$ conversion. This system may take the form, for example, of a simple gaseous mixture of the individual components. Another essential feature of the disclosed invention is the conversion of gaseous $SO_2$ and $NO_x$ into particulates such as acid mists and other particulates by electromagnetic irradiation most favorable to free radical formation and $SO_2$ excitation, preferably $h\nu$ (4000-3400Å) and $h\nu$ (3400-2400Å) with peaks at or near 3700Å and 2850Å, respectively, followed by conventional particulate removal. In a preferred embodiment of the invention, an optional introduction of gaseous ammonia into the irradiated stream leaving the reactor is effected prior to the particulate removal step. In another preferred embodiment, the recovered nitrogeneous and sulfurous compounds are subjected to further treatment and separation for the recovery of valuable products and byproducts which may at the same time significantly reduce the already comparably low solid and liquid wastes. In fact, compared to the solid waste disposal problems of the lime and limestone wet scrubbing flue gas desulfurization processes, the waste problems incidental to the desulfurization and denoxification ($NO_x$ removal) of the disclosed photochemical process are relatively minor.

The disclosed process can be used either primarily for $SO_2$ or $NO_x$ emissions control, or both. Furthermore, it offers the additional advantage of controlling at the source the major reactants of atmospheric photochemical reactions, thus the reduction of all products and byproducts of atmospheric photochemical reactions.

In addition to the photochemical air pollution control of fossil fuel combustion products such as $SO_2$, $NO_x$ and others, the present invention provides a process that can be used for the photochemical production of organic and inorganic acids from fossil fuel combustion products, the photochemical production of fertilizers from fossil fuel combustion products, and the photochemical removal and recovery of other valuable byproducts from fossil fuel combustion products.

DESCRIPTION OF THE PREFERRED EMBODIMENTS

Figure 1:
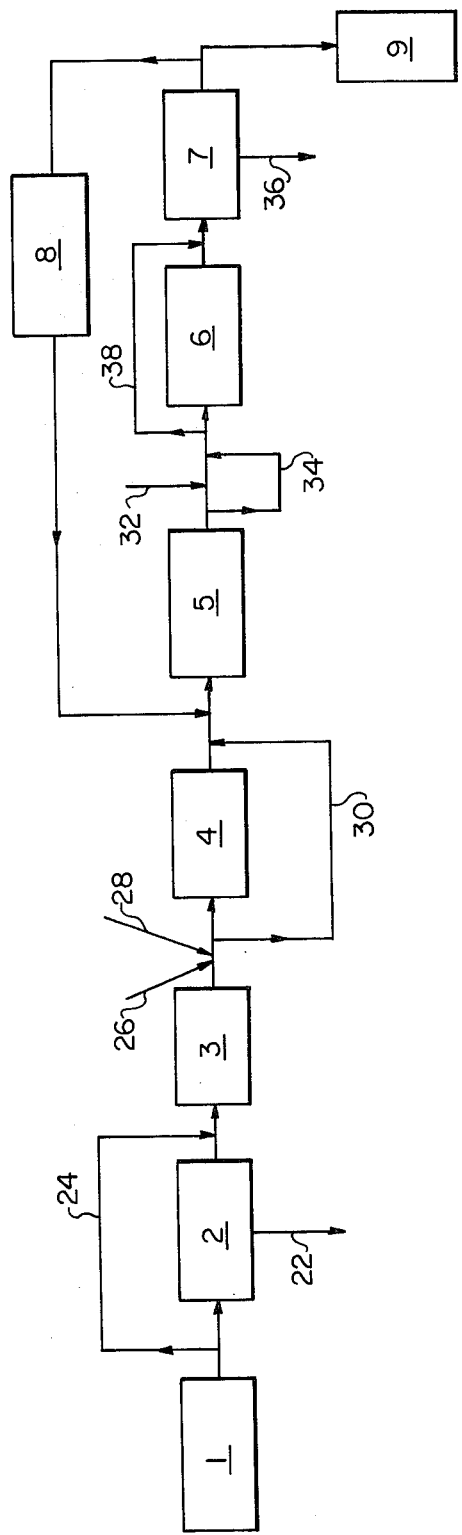

FIG. 1 schematically illustrates a simple form of the system of apparatus embodying the disclosed invention.

The combustion sources which comprise sulfur-bearing fossil fuel combustion products are shown diagrammatically at 1 and are passed into a conventional particulate control device or system 2, which may consist of a gravity settling chamber, a cyclonic separator, electrostatic precipitator, or other similar control devices, and the system 2 may in practice consist of any desired combination of these well known control devices.

Particulate materials such as soot, ash, metal oxides and the like are removed from the control system 2 at line 22. In certain instances, it may be desired to optionally by-pass some or all of the fuel combustion products around the control system 2, as shown by bypass line 24, with the combustion products in such event being conveyed directly into heat exchanger 3.

The heat exchanger 3 functions to cool the combustion gases to the desired temperature, preferably between 100° and 300° C. After passage through the heat exchanger, reactive hydrocarbons or reactive hydrocarbon mixtures are added at line 26, and oxygen or air is introduced at line 28. A fan or compressor 4 is provided to move the combustion products with the reactive hydrocarbons down stream in the system, with the pressure of the combustion products stream being increased to between 1 and 10 atmospheres. Depending on system conditions, a certain portion of the combustion products stream can bypass the fan or compressor 4 as shown at 30 for reentry into the line downstream of the compressor.

The combustion products stream under pressure is passed to a photochemical irradiation chamber or reactor shown diagrammatically at 5 for irradiating the stream as above described. Downstream of the reactor 5, ammonia is introduced through line 32 to promote aerosol formation, although this step can be bypassed if desired as indicated by line 34.

A further heat exchanger 6 is provided for cooling the stream to promote aerosol formation, that is, condensation, agglomeration, coalescence, and the like, with the stream flowing to a further particulate control device or system 7 which may consist of individual or combinations of wet scrubbers, fabric filters, electrostatic precipitators, or other collection devices known in the art. The particulate materials, including nitrogenous, sulfurous and other compounds are removed at line 36, and such compounds will be aqueous if wet scrubbers are employed in the control system 7. As noted by bypass line 38, depending upon operating conditions, the heat exchanger 6 may be bypassed and the combustion products stream passed directly to the particulate control device 7.

After passing from the control device 7, the cleaned flue gases, which are desulphurized and denoxified, are directed to stack 9 for passage to the atmosphere. Depending upon the quality of the cleaned flue gases, all or a portion of the flue gases may be recirculated by fan or compressor 8 back into the system in advance of the photochemical reactor 5 for further treatment.

It will be understood that all of the equipment schematically illustrated in the drawing, FIG. 1, and above referred to is commercially available, and no invention resides therein. Rather, the invention resides in the particular use and arrangement of such equipment in accordance with the foregoing description.

Some of the major considerations in the election of the operating conditions of the reactor (temperature, pressure, reactant mixture composition and reactant ratios) and the selection of particulate control system for the removal of the particulate products of photochemical reactions are as follows.

With respect to the selection of particulate control systems, wet scrubbing is preferred because some products of photochemical reactions, e.g. liquid peroxyacetylnitrates, are known to be explosion hazards and because of the reasonably high fine particulate collection efficiency of such system. The wet system has the additional advantage of removing portions of gaseous pollutants such as $NO_2$.

In regard to pressure, because most of the products and byproducts of photochemical reactions are wanted in particulate form, which are formed from gaseous pollutants, according to the theorem of Chatelier, the formation of particulates is promoted by increasing the reactor pressure. On the other hand, increasing pressure increases the dissociation energy of $NO_2$ and RHCs and the general process energy requirement (compression), not to mention capital investment.

With respect to temperature, the reactor temperature has to be sufficiently low to prevent outright combustion of the reactive hydrocarbons and the decomposition particulate products but high enough to promote free radical formation at the minimum electromagnetic energy consumption. However, after most of the photochemical reactions have taken place, particulate formation is enhanced by lowering the combustion products stream temperature.

With respect to reactant ratios/RHC requirements, it is well known that RHCs, when undergoing photochemical dissociation, produce, in a chain reaction fashion, unpredictable number and kind of free radicals depending on radiation intensity, the species of RHC and other conditions. For each combustion products stream, where composition is also highly variable, there is a range of RHC/$SO_2$ and RHC/$NO_x$ ratio which favors photochemical conversion. Since the theoretical prediction of the optimum reactant ratios is impossible and because no general rules can be derived from isolated and non-standardized experiments, the best rule to follow is to experimentally determine the optimum reactant ratios for each particular application.

In regard to reactor residence time/Electromagnetic reactor energy requirements, since the electromagnetic energy absorption follows Beer's absorption law, it can be stated that, for a fixed intensity radiation, the energy absorption efficiency can be increased by increasing the reactor cell length and by increasing the concentration of the substance of interest. The photochemical conversion efficiency, related to absorbance, can be increased by increasing the residence time of the gaseous streams in the reactor which can also be achieved by recirculation of part of the cleaned stream, which minimizes energy loss on particulates formed in the reaction. The electromagnetic energy requirement for the photochemical reactions are expected to be considerably lower than for similar systems without the benefit from the presence of free radicals derived from reactive hydrocarbons.

In regard to further considerations of the system parameters, radiation intensity dramatically increases the rate and efficiency of photochemical conversion reactions. A problem, not entirely insurmountable, is anticipated by particulate deposition on the outer surface of UV irradiators. Such deposition significantly reduces light energy transmission thereby resulting in undesirable loss of energy.

The invention as herein-above set forth is embodied in particular form and manner but may be variously embodied within the scope of the claim hereinafter made.

It is understood that various modifications may be introduced into the embodiments illustrated and described without exceeding the scope of the invention.

I claim:

1. A process for treatment of a gaseous mixture containing $NO_x$ and $SO_2$ wherein X is 1 or 2, which comprises:

a. addition of reactive olefinic hydrocarbon and oxygen to said mixture in sufficient quantity to form an enriched mixture favorable to free radical formation and photochemical conversion of said $NO_x$ and $SO_2$, b. irradiation of said enriched mixture with electromagnetic radiation having a wave length of from about 1500Å to about 7500Å to form free radicals and produce particulate formation, and c. separation of particulate material from said irradiated mixture.

2. The process as defined by claim 1, wherein said gaseous mixture is the product of combustion fossil fuels.

3. The process as defined by claim 1, wherein said gaseous mixture contains in addition to $NO_x$ and $SO_2$ gaseous $O_2$ and gaseous $H_2O$.

4. The process as defined by claim 1, wherein oxygen is added to said mixture prior to said irradiation step (c).

5. The process as defined by claim 1, wherein said reactive olefinic hydrocarbon is a straight chain hydrocarbon.

6. The process as defined by claim 5, wherein said reactive hydrocarbon is selected from the group consisting of propylene and CIS-2-butene.

7. The process as defined by claim 1, wherein said electromagnetic radiation is in a range of 4000-3400Å and 3400-2400Å.

8. The process as defined by claim 1, wherein after irradiation step (c) gaseous ammonia is added to said system to promote particulate formation.

9. The process as defined by claim 1, wherein said addition and irradiation are performed on a continuously flowing gaseous stream of fossil fuel combustion products.

* * * * *